United States Patent [19]

Winter et al.

[11] 4,037,445
[45] July 26, 1977

[54] METHOD AND APPARATUS FOR PRODUCTION OF MULTIPLE GAUGE STRIP

[75] Inventors: Joseph Winter, New Haven; Eugene Shapiro, Hamden; Warren F. Smith, Branford, all of Conn.

[73] Assignee: Olin Corporation, New Haven, Conn.

[21] Appl. No.: 718,850

[22] Filed: Aug. 30, 1976

Related U.S. Application Data

[63] Continuation-in-part of Ser. No. 642,594, Dec. 19, 1975, Pat. No. 3,992,977, and Ser. No. 645,749, Dec. 31, 1975, Pat. No. 4,015,459, which is a continuation-in-part of Ser. No. 462,755, April 22, 1974, abandoned, said Ser. No. 642,594, is a continuation-in-part of Ser. No. 462,851, April 22, 1974, abandoned.

[51] Int. Cl.² .............................................. B21C 3/10
[52] U.S. Cl. .......................................... 72/60; 72/275; 72/276; 72/278
[58] Field of Search ............... 90/24 R; 72/41, 45, 72/60, 274, 275, 276, 278, 467, 468

[56] References Cited

U.S. PATENT DOCUMENTS

| | | | |
|---|---|---|---|
| 2,936,679 | 5/1960 | Thuerwachter | 90/24 R |
| 3,055,102 | 9/1962 | Shaw et al. | 72/41 |
| 3,680,348 | 8/1972 | Nino et al. | 72/468 |
| 3,760,488 | 9/1973 | Cucuz et al. | 90/24 R |
| 3,782,164 | 1/1974 | Felker | 72/467 |

*Primary Examiner*—Michael J. Keenan
*Attorney, Agent, or Firm*—Robert H. Bachman; Robert A. Dawson; Joseph Fleischer

[57] ABSTRACT

Multiple gauge metal strip is prepared by a process which comprises first shaving said strip by a process comprising drawing said strip through a shaving apparatus adjusted to achieve maximum stock removal in relation to the yield strength of said strip whereby said yield strength is not exceeded whereby surface reduction is confined to an area comprising 5 to 50% of total surface area and volume reduction ranges from 10 to 60% of initial strip cross sectional area, and drawing the strip through a die which defines the desired final cross sectional configuration to produce a reduction of said strip to final dimension, wherein said drawing is performed without direct surface-to-surface contact between said strip and said die.

14 Claims, 6 Drawing Figures

METHOD AND APPARATUS FOR PRODUCTION OF MULTIPLE GAUGE STRIP

CROSS REFERENCE TO RELATED APPLICATIONS

The present application is a Continuation-In Part of co-pending application Ser. No. 642,594, filed Dec. 19, 1975, now U.S. Pat. No. 3,992,977 which is in turn a Continuation-In-Part of Ser. No. 462,851, filed Apr. 22, 1974, now abandoned; and co-pending application Ser. No. 645,749, filed Dec. 31, 1975, now U.S. Pat. No. 4,015,459 which is in turn a Continuation-In-Part of application Ser. No. 462,755, filed Apr. 22, 1974, now abandoned, all by the Inventors herein.

BACKGROUND OF THE INVENTION

The invention relates to a method and apparatus useful for the preparation of multiple gauge metal strip by an operation comprising a draw-shaving operation and a drawing operation employing hydrodynamic lubrication.

In many applications, such as the production of copper alloy strip for the formation of electrical connectors and the like, it is necessary to provide a multiple gauge thickness in the metal strip. Heretofore, such conventional procedures as continuous milling have beem employed to produce the desired variations in gauge. Such processes suffer from the disadvantages of being time-consuming and generating an unfavorable form of scrap.

Another procedure which has been investigated in the art comprises the reduction to gauge by a rolling operation. Rolling operations in production are unfavorably restricted to certain shapes, tend to involve complex and costly tooling and are not good enough to provide products meeting commercial tolerances and that are free from structural defects.

Another approach to metal reduction which has been investigated is the combination of shaving followed by drawing as disclosed in U.S. Pat. No. 3,055,102 to Shaw et al. In Shaw et al., a workpiece is reduced uniformly along its entire surface area by a method which employs a tool combining a 360° cutting head mounted ahead of a drawing or extrusion die, between which is provided a channel for the introduction of a lubricating fluid into contact with the workpiece. Shaw et al. suggest that the fluid is employed to minimize or eliminate chatter or wandering of the workpiece during the combined operation, and in that connection, is preferably maintained under pressure while in contact with the workpiece.

Though Shaw et al. deal with a combined process, certain deficiencies exist in its application to multiple gauge metal strip. Specifically, the application of shaving force against only a portion of the total surface of the workpiece would magnify the problems which Shaw et al. sought to remedy in such a manner and at such a degree that the solution proposed in the patent would prove inadequate. The chatter and uneven surface would not be effectively prevented by the employment of the pressurized fluid in contact with the workpiece exiting the shaving tool cutting edge.

With respect to the application of drawing to the preparation of multiple gauge metal strip, certain complications result from the tendency of conventional metal flow. That is, in the normal drawing process, reduction of the thickness in a section results in an increase in section length, so that if the thickness of a given shape varies across its width, the drawing process will result in variable changes in length causing non-uniform metal flow and stresses leading to buckling, twisting, tearing and fracture of the workpiece. Though a wide variety of drawing techniques are known, including the employment of the hydrodynamic principal, none have been suggested or would appear to alleviate the aforenoted deficiencies associated with the drawing of complex multiple gauge configurations. Referring specifically to Shaw et al., the drawing die illustrated therein would be uncapable of controlling the above-noted tendencies while simultaneously attempting to prevent the occurrence of wandering and chatter resulting from the shaving process.

Thus, the individual difficulties recognized with respect to shaving and drawing techniques as applied to multiple gauge strip would appear to be magnified rather than reduced by the application of the method and apparatus of Shaw et al. Moreover, the individual known techniques of shaving and hydrodynamic drawing would appear to offer little if any alleviation of the aforenoted problems and would not suggest the method and apparatus employed herein.

SUMMARY OF THE INVENTION

In accordance with the present invention, it has been found that multiple gauge metal strip may be prepared by a process which comprises shaving said strip by drawing said strip while under back tension through a shaving apparatus whereby surface reduction of the strip is confined to an area comprising from about 5 to about 50% of total surface area, and volume removal of strip material ranges from about 10 to about 60% as measured in relation to initial strip cross sectional area, and drawing the strip through a die defining said rectangular cross section wherein direct surface-to-surface contact between said strip and said die is prevented, the width dimension of said strip is unchanged and the ratio of strip surface to strip cross sectional area changes by at least 30%.

The method of the present invention may be practiced in varied sequence, whereby the incoming strip may be shaved to a predetermined gauge and then hydrodynamically drawn to final dimension in either a single continuous operation or in two or more distinct operations between which various metal treatments such as interanneals may be interposed. In a specific embodiment, the strip is continuously shaved and then drawn in one operation occurring between a single pair of pay-out and take-up capstans. In a further embodiment, the strip is drawn to a given dimension and then further shaved to final shape.

The process of the present invention confers the advantage of reducing scrap generation during the forming of the particular strip configuration, as the drawing operation operates to prevent actual metal removal. Further, the employment of the present method enables the strip to acquire greater strength levels through work hardening.

In accordance with the present invention, apparatus for the preparation of multiple gauge metal strip is disclosed which comprises an adjustable shaving apparatus comprising a shaving tool provided with horizontal and vertical adjustment means and further adjustable to define a particular angle of incidence or rake angle in relation to the incoming strip, and a drawing apparatus comprising a hydrodynamic lubrication section containing a quantity of suitable lubricant which is located adjacent a reduction section ending in a drawing die of appropriate configuration, whereby the incoming strip picks up lubricant which is then placed in compression against the surface thereof to effect the drawing of the strip without surface contact with the drawing die.

Accordingly, it is a principal object of the present invention to provide a method for the manufacture of multiple gauge metal strip which enables the continuous preparation of metal strip of exacting tolerance.

It is a further object of the present invention to provide a method as aforesaid which results in the reduced generation of metal scrap and confers improved mechanical properties on the strip product.

It is a further object of the present invention to provide a method as aforesaid which may be operated in one pass.

Further objects and advantages will become apparent to those skilled in the art from a consideration of the ensuing description which proceeds with relation to the following drawings.

DETAILED DESCRIPTION

Figure 1:
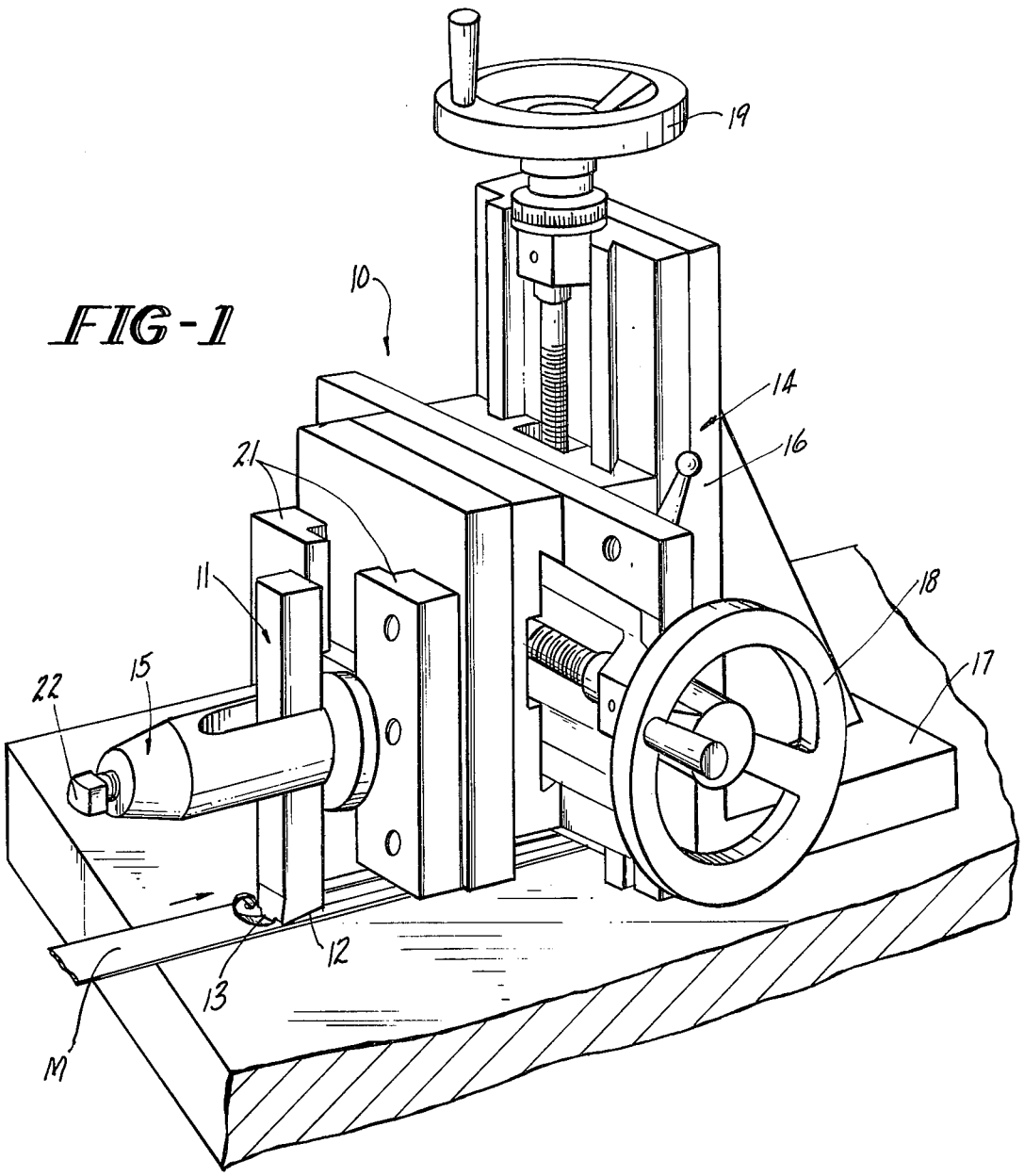
FIG. 1 is a perspective view of a shaving apparatus employed in accordance with the present invention.

In accordance with the present invention multiple gauge metal strip of generally rectangular cross section possessing regions of two or more variable levels of depth is prepared by a method comprising drawing the strip while under back tension through a shaving apparatus whereby an appropriately configured shaving tool engages the surface of said strip so as to continually inscribe a particular pattern therein. The shaved strip may then either be given an intermediate annealing treatment or the like, or may be directly introduced into a drawing die whereby the strip is subjected to hydrodynamic lubrication and drawing is achieved without surface-to-surface contact between the incoming strip and the drawing die.

The shaving method of this invention may be conducted to achieve strip surface reductions within an area comprising from about 5 to about 50% of total surface area, and preferably from about 10 to about 40% of said area, and strip volume removal of from about 10 to about 60%, and preferably from about 15 to about 50%, as measured in relation to the measured change in strip cross sectional area.

The drawing operation noted above employs hydrodynamic lubrication which facilitates one pass cross sectional reductions ranging from 39 to 55% thickness wherein the width dimension of the strip is unchanged and the ratio of strip surface, comprising the measured perimeter of the strip, to strip cross sectional area changes by at least 30%, and preferably from 30 to 50%.

As noted earlier, the method of the present invention may be practiced in a variation of sequences to achieve products of complex cross sectional configuration. Thus, the primary sequence employed comprises the initial inscription of the multiple gauge pattern by the draw shaving technique, followed by the employment of hydrodynamic drawing of the formed shape to refine and strengthen the patterned strip. This primary sequence has been found to confer the greatest economy and quality of production, as the shaving operation efficiently removes the bulk of the unwanted material from the incoming strip, and the drawing operation achieves the desired refinement of tolerance and strengthening of the product through work hardening. This sequence can be modified in the instance where the product possesses a variety of complex indentations by the provision of a shaving step following the drawing operation as will be illustrated later on.

The shaving operation employed in accordance with the present invention is disclosed in our copending application Ser. No. 642,594, issued Nov. 23, 1976 as U.S. Pat. No. 3,992,977, the disclosure of which is incorporated herein by reference. A shaving method is disclosed therein which comprises drawing the strip while under back tension through a shaving apparatus whereby a shaving tool defining a cutting edge possessing the desired multiple gauge configuration engages the surface of the strip and continually inscribes the desired pattern thereon.

The shaving apparatus employed in accordance with the present invention comprises an adjustable shaving tool provided with a cutting edge defining a pattern corresponding to the multiple gauge surface desired in the final strip product. The shaving tool is primarily adjustable in two respects to enable shaving to be conducted to successfully achieve maximum possible strip reductions measured primarily in terms of volume removal. Maximum volume removal per shaving pass may be generally determined in relation to the yield strength of the strip and then coordinated with the cross sectional configuration of the desired end product. This being done, the apparatus is then appropriately adjusted to achieve the extent of volume removal desired. The apparatus will be described in greater detail hereinbelow.

Referring to FIG. 1, a shaving apparatus useful in accordance with the present invention is illustrated in perspective. Apparatus 10 comprises a bar-shaped shaving tool 11, which is positioned in the Figure with cutting edge 12 located adjacent and on top of respective metal strip M. As noted above, cutting edge 12 defines a cutting pattern 13 whose configuration serves as the template for the final configuration of the multiple gauge strip product. As will be seen in greater detail in FIG. 2, cutting edge 12 is disposed at a critical angle with respect to strip M which facilitates the continuous operation of the method of this invention.

Referring further to FIG. 1, shaving tool 11 is supported by adjustable tool holder 14 comprising tool support structure 15 held within adjustable housing 16. Housing 16 is fastened to a flat supporting surface through base 17, which is provided with a tunnel-like channel for the passage therethrough of strip M. Housing 16 is provided with a horizontal adjustment 18 and a vertical adjustment 19 comprising, respectively, calibrated screw-driven slide connections. Adjustments 18 and 19 are fine adjustments provided in addition to a gross adjustment which comprises slidable tool support structure 15 located within tracks 21. Thus, when the appropriate vertical position is determined in gross, support structure 15 is held stationary and fixed in position by tightening screw threaded nut 22 against shaving tool 11, whereby the back plate of support structure 15, not shown, is brought into firm engagement with tracks 21. Thereafter, fine adjustments of both vertical and horizontal position can be made with adjustments 18 and 19 noted earlier.

As stated above, adjustments of depth of cut or maximum stock removal are determined with respect to the yield strength of the strip and the particular configuration desired. In addition to the aforenoted adjustments of vertical and horizontal position of the shaving tool, a further critical adjustment is made which relates to the rake angle of the tool edge. The rake angle may be defined as the angle which the plane of the vertical leading surface cutting tool or blade defines with respect to an imaginary vertical plane perpendicular to the direction of strip travel.

Figure 2:
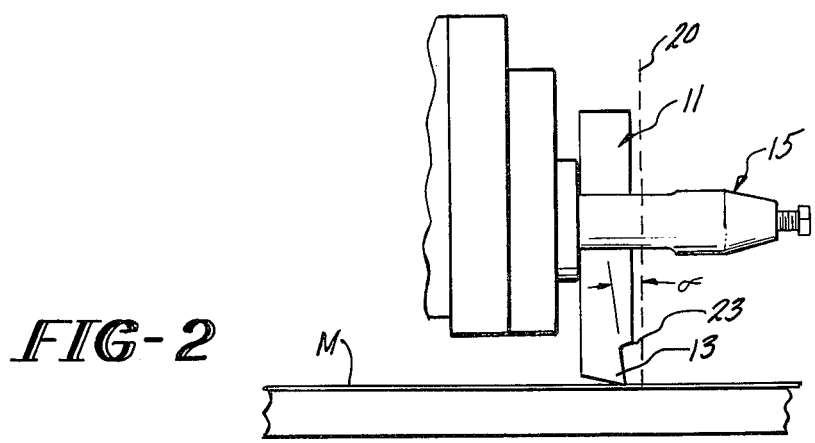
FIG. 2 is a side view of the shaving apparatus shown in FIG. 1.

Referring to FIG. 2, tool 11 is shown in greater detail wherein an angle $\alpha$ is defined which is measured from plane 20, shown in phantom which is perpendicular to the direction of strip M, and the inclined surface 23 employed at the lower portion of tool 11 closest to strip M. In accordance with the present invention, it has been found that a certain critical rake angle exists, which exceeded, results in a loss of control of the thickness of the finished strip product. Often, a rake angle in excess of the critical value causes the workpiece to ride up the tool, with the result that excessive strip material is removed. The rake angle found to be useful in the present method may range from about $2\frac{1}{2}$ to about 25°, and preferably from about 5° to about 18°. Accordingly, and as illustrated in FIG. 2, tool 11 is constructed such that the desired shape including the rake angle is machined into the tool tip or cutting edge 12. The vertical leading face of the tool integral with cutting edge 12 is thus inclined at an angle lying within the range of rake angles noted above After the appropriate adjustments of shaving tool 11 have been made, shaving of strip M is accomplished by pulling the strip across cutting edge 12 with the necessary force to overcome the shaving resistance at the tool. As noted earlier, strip M is supported and guided in part by the flat surface supporting tool holder 14. In addition, further supports or guides, not shown, could be employed in lateral relation to the edges of strip M to prevent lateral wandering from occurring during the shaving operation.

The shaving operation employed in accordance with the present invention may be practiced as a single-pass or multiple-pass operation. Thus, when the amount of stock removal desired by the specific configuration sought exceeds the maximum possible stock removal per pass, the desired amount of stock removal may be divided among a plurality of shaving passes which may be of equal amount of percentage removal whereby the yield strength of the strip is not exceeded and strip rupture is thereby prevented. Thus, the strip may be subjected to a single shaving pass achieving a desired percentage or reduction or may be subjected to several such shaving passes, during which the material is brought through the shaving apparatus, rewound on a take-up capstan and subsequently rerun through the apparatus for a further shaving pass..

After the shaving operation discussed above is completed, the strip may be subjected to a hydrodynamic drawing operation. As noted earlier, the strip may be drawn as part of the shaving operation, in which case the shaved strip exits the shaving tool and directly enters the drawing apparatus. Alternately, the shaved strip may be removed from the apparatus and given an intermediate treatment such as an interanneal to achieve a given temper before drawing is conducted. The drawing operation of the present invention, which is disclosed in our copending application Ser. No. 645,749 noted above, the disclosure of which is incorporated herein by reference, features the employment of hydrodynamic lubrication. As noted therein, the essential feature of hydrodynamic lubrication comprises the provision of a lubricant film of sufficient thickness to prevent contact between the deforming metal and the forming die.

Figure 3:
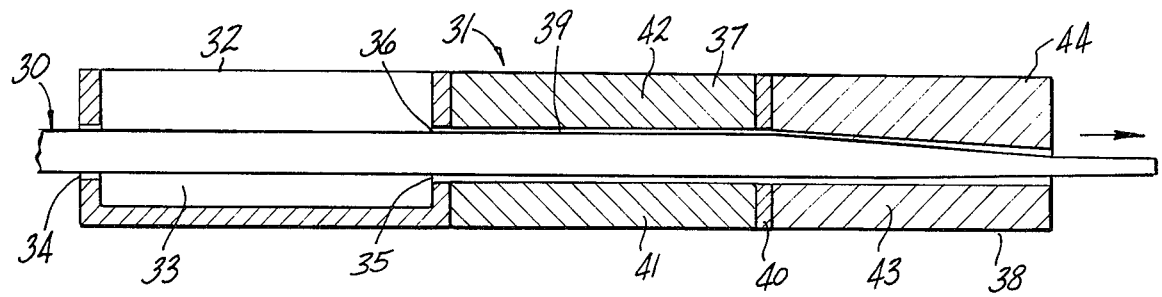
FIG. 3 is a cross sectional schematic view of the drawing apparatus employed in accordance with the invention.

The method of this invention is illustrated in FIG. 3 which schematically depicts a multiple gauge metal strip 30 passing through the drawing apparatus 31 of this invention. As noted above, strip 30 has already received a primary multiple gauge configuration by the shaving operation set forth above and, therefore, does not undergo a major change in shape during drawing through apparatus 31. The strip first passes through a container 32 which houses a quantity of lubricant 33 sufficient to completely cover the strip. Passage through container 32 is afforded by openings 34 and 35, respectively, which are in linear alignment with the entrance 36 to the hydrodynamic section 37. The strip then enters hydrodynamic section 37 bearing on its surface lubricant 33 picked up during its passage through container 32.

Hydrodynamic section 37 comprises an adjustable inlet nozzle defining a cross sectional area of a size sufficient to enable the passage of lubricant-coated strip 30. As strip 30 passes through hydrodynamic section 37, the lubricant picked up by the moving workpiece is compressed and exerts a substantial pressure on the strip. The lubricant pressure which develops in the reduction section 38 must be sufficient to cause the desired shape change dictated by the die configuration without permitting surface-to-surface contact between the die and the strip. The determination of the lubricant pressure is governed by several factors, such as lubricant viscosity, inlet nozzle length, drawing speed, clearance between the strip and nozzle and flow rate of lubricant through the reduction section. These factors can be varied to produce the required pressure to provide the desired cross sectional reduction of the strip and will be discussed in greater detail hereinafter.

The moving strip under lubricant pressure passes from hydrodynamic section 37 to reduction section 38, where it is drawn into the final product. Reduction section 38 comprises a drawing die which defines a multiple gauge configuration. As stated above, drawing is accomplished without surface-to-surface contact between the die and strip 30, as well as no change in the width of strip 30 issuing from reduction section 38.

The essence of hydrodynamic lubrication in the present drawing operation is the provision of sufficient lubricant pressure to achieve drawing without surface-to-surface contact between the strip and the die. One of the contributing factors is lubricant viscosity. It has been found that lubricants of higher viscosity overcome certain difficulties in the employment of the hydrodynamic principal, among them lubricant leakage and sufficient pressure build up. The employment of a lubricant material such as a drawing soap further affects the fabrication of the die, as sealing abilities of the components are less critical, and the dimension, specifically those of the length of the inlet nozzle and the clearance between the strip and the nozzle. Accordingly, nozzle length may be decreased and the clearance 39 as depicted in FIG. 3, which represents the distance between the wall of the nozzle and the surface of the strip, may be increased, with the further advantage that the tolerance requirements for the incoming strip may be relaxed.

Other factors influencing lubricant pressure comprise drawing speed and flow rate of lubricant through the reduction section, both of which are positively correlated therewith. Thus, increased drawing speed results in increased lubricant flow rate, both of which increase the pressure exerted on the incoming strip.

As noted earlier, another feature of the method of this invention resides in the design of the reduction section. Certain dimensional criteria were determined to be important in order to ensure straight exiting of the strip without buckling. These criteria are as follows:

1. The same volume of material must exit the die as enters the die.

2. There must be equal percentage reductions in height over the entire cross section of the strip and reductions must occur uniformly in any transverse plane section through the deformation zone. That is, if a transverse section were to be observed at any point along the deformation zone, the percentage reduction across the entire section of the strip, including all variant gauge sections, should be equal. In accordance with this requirement, the surfaces of the die which define the variation in gauge must be disposed at slightly different angles with respect to each other, as well as to the longitudinal direction of the strip workpiece. This particular aspect of the invention will be illustrated by the description of the drawing die in Example I, below.

3. There is to be no change in the width dimension of the strip workpiece as a result of the drawing operation. As noted before, this requirement dictates that the reduction occasioned by the present invention is not uniformly taken across the entire surface of the workpiece, with the result that the surface to cross sectional area ratio varies by at least 30%, and particularly between 30 and 50%. This variation distinguishes the preparation of products in accordance with the present invention from multiple gauge processes and products known in the art. Further, the maintenance of substantially the same surface component throughout the drawing operation comprises one of the unexpected aspects of the invention, as the frictional component of the process, normally linearly related to the surface component, is not proportionately diminished as with conventional drawing processes wherein all dimensions of the workpiece are simultaneously proportionately reduced. Particularly, the significant reductions in strip cross sectional area render the successful practice of the present method even more surprising, as the significantly reduced strip is less capable of coping with the consistently high level of friction exerted through the virtually unchanged surface area.

Referring again to FIG. 3, the apparatus useful for hydrodynamic drawing in accordance with this invention is schematically depicted in gross. Thus, container 32 housing a quantity of lubricant 33 is shown in linear alignment with hydrodynamic section 37 such that strip 30 may pass through openings 34 and 35 and into the inlet nozzle comprising hydrodynamic section 37. Though hydrodynamic section 37 is illustrated as detachably connected to reduction section 38, it is contemplated within the scope of this invention that both sections may be combined in a unitary structure. The connection between hydrodynamic section 37 and reduction section 38 is rendered leak-proof by seal member 40 which may comprise a 0.005 inch thick flat copper sheet gasket. Both hydrodynamic section 37 and reduction section 38 are comprised of a primary shape-defining element and a secondary shape-defining element. In hydrodynamic section 37 primary nozzle element 41 comprises the base of the nozzle and secondary nozzle element 42 comprises the top which is fastened thereto. Likewise, reduction section 38 is comprised of primary die element 43 which serves as the base of the die and secondary die element 44 attached thereto.

In practice, the use of hydrodynamic drawing entails the provision of a starter or leader portion of the strip to be drawn in a thickness corresponding to that defined by the drawing die. Thus, in one embodiment, the strip is placed with a leading edge protruding from the drawing die, and pressure is then brought upon secondary die element 44 whereby strip 30 is compressed to the thickness illustrated in FIG. 3. After this compression is achieved, drawing of the remainer of the strip material may commence and will be carried out without further interruption.

Figure 4:
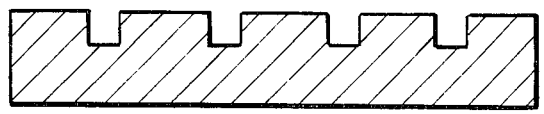
FIGS. 4, 5 and 6 are schematic cross sectional views of multiple gauge strip configurations prepared in accordance with the invention.
Figure 5:
Figure 6:

In order to gain a fuller understanding of the method of this invention and to illustrate the underlying principals thereof, the following examples are presented which were conducted to prepare multiple gauge products resembling, respectively, the configurations set forth in FIGS. 4, 5 and 6.

EXAMPLE I

Rectangular strip prepared from CDA Alloy 260 was treated in accordance with the present invention by a process which initially involved a shaving operation conducted with shaving tool as illustrated in FIG. 1 together with a strip guide and coiler and recoiler reels to pay-off and wind-up the strip. The pay-off reel was controlled to exert a back tension on the strip entering the shaving apparatus. The initial strip material possessed the cross sectional measurements of a width of 1 inch and thickness of 0.080 inch. The strip was shaved in one pass to produce a cross sectional shape resembling that illustrated in FIG. 4 which consisted of a flat strip 0.080 inch thick with four 1/16 inch rectangular grooves 0.030 inch deep in which about 12% of the surface area has been removed. The total volume removed by the shaving pass was about 9%.

The as-shaved strip was then hydrodynamically drawn to approximately a 30% reduction in strip cross sectional area. Drawing was initiated by the placement of compressive force of a gradually increasing nature to a maximum of approximately 30 tons placed upon the leading edge of the strip which had been inserted into the reduction section of the drawing apparatus. Upon compression of the strip to the dimensions of the drawing die orifice, drawing was commenced, which employed a graduated drawing die defining a die angle for the major thickness dimension of the strip of 10° and a die angle for the indentation or minor thickness of the strip of 2.52°. A one pass reduction of 30% was achieved with the result that the final dimensions of the strip were reduced to a maximum thickness of 0.056 inch and a minimum thickness, measured from the grooves of 0.035 inch. The product exhibited a smooth matte surface and was generally uniform and linear.

EXAMPLE II

A further sample of CDA Alloy 260 was selected for preparation of the multiple gauge configuration shown in FIG. 5. Shaving was conducted at a speed of 85 feet per minute on a strip possessing the initial dimensions of 1.201 × 0.098 inch. The shaving tool was disposed at a rake angle of 12° and a shaving tension of 5,535 lbs. was employed. The depth of cut achieved was 0.028 inch and the volume removal comprised of 18%. The final dimensions of the shaved strip comprised of a major thickness of 0.098 inch, a minor thickness of 0.071 inch and a width of 1.2 inches.

The above strip was then drawn to a 29% reduction at a drawing speed of from 7 to 85 per minute. The draw force exerted on the strip ranged from 2,475 to 2,700 lbs., and the film thickness of the lubricant employed ranged from 0.0005 to 0.0015 inch, and was thickest at the intermediate speeds. The dimensions of the finally drawn strip comprised a major thickness of 0.070 inch, a minor thickness of 0.053 inch and a width of 1.1995 inches. The drawn product likewise possessed an acceptable surface appearance and dimensional uniformity.

EXAMPLE III

The present example illustrates an instance of the use of draw shaving subsequent to a hydrodynamic drawing operation. Strip material prepared from CDA Alloy 110 was provided in a width of 1.643 inches and a thickness of 0.115. inch. The strip material was in spring temper. The initial configuration comprising a center channel of a depth of 0.041 inch and a width of 0.540 inch was inscribed by shaving. The area removed by the shaving operation comprised of 18% of the strip volume. As the maximum area removed was determined to be 17% in one pass, two passes were employed.

The shaved strip was then annealed at 375° C for 1 hour and was subsequently cleaned in a reducing atmosphere to remove accumulated surface oxide. The strip was then hydrodynamically drawn to achieve a 5% reduction and to provide the desired temper for further processing. The strip possessed the final dimension comprising a major thickness of 0.109 inch and a final channel depth of 0.039 inch. After drawing, the strip was further processed by shaving to confer the final cross sectional configuration as shown in FIG. 6. Four V-shaped grooves were placed in the channel area of the strip which possessed depths measuring 10% of the thickness of the channel by a shaving operation which was conducted in one pass. The four grooves were provided by shaving as the tooling necessary for the provision of the grooves by hydrodynamic drawing was prohibitive in cost and effort. The resulting strip product possessed improved strength and tolerance conformity over similar product produced by conventional processing.

From the above, it can be seen in the present method is adaptable to a wide variation in sequence to account for specific multiple gauge configuration. Likewise, the respective operations may be conducted in either a continuous manner, or sequentially whereby intermediate metal treatment steps may be conducted.

Though particular apparatus has been disclosed and suggested herein, it is to be understood that the present invention may be practiced on apparatus of variations in design which is suitable for the achievement of the objectives disclosed herein.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for the production of a multiple gauge metal strip product of generally rectangular cross section possessing regions of two or more variable thicknesses providing a generally stepped surface configuration, said method comprising
    shaving said strip by drawing said strip while under back tension through a shaving apparatus whereby surface reduction of the strip is confined to an area comprising from about 5 to about 50% of total surface area, and volume removal of strip material ranges from about 10 to about 60% as measured in relation to initial strip cross sectional area; and
    drawing the shaved strip through a die defining said rectangular cross section wherein direct surface-to-surface contact between said strip and said die is prevented, the width dimension of said strip is unchanged and the ratio of strip surface to strip cross sectional area changes by at last 30%.

2. The method of claim 1 wherein said surface reduction ranges from 10 to 40% and said volume removal ranges from about 15 to 50%.

3. The method of claim 1 wherein, prior to shaving said strip, said shaving apparatus is adjusted to achieve the maximum possible stock removal per pass, said maximum stock removal determined in relation to the yield strength of said strip.

4. The method of claim 3 wherein said adjustments comprise the adjustment of the cutting depth and rake angle of a shaving tool comprising said shaving apparatus.

5. The method of claim 4 wherein said rake angle ranges from about 2½ to about 25° determined with respect to the vertical plane.

6. The method of claim 5 wherein said rake angle ranges from about 5° to about 18°.

7. The method of claim 4 wherein said adjustments further comprise the fine adjustment of both the horizontal and the vertical dimensions of the position of said shaving tool in relation to the incoming strip.

8. The method of claim 1 wherein said shaving is conducted in more than one pass.

9. The method of claim 1 wherein said shaving is conducted in one pass.

10. The method of claim 1 wherein said strip undergoes reduction taken on the broad surfaces thereof during said drawing step.

11. The method of clalim 1 wherein said change of the ratio of strip surface to strip cross sectional area occurring during said drawing comprises an increase.

12. The method of claim 11 wherein said ratio changes by an amount ranging from 30 to 50%.

13. The method of claim 1 wherein said drawing employs hydrodynamic lubrication and achieves one pass cross sectional reductions ranging from 39 to 55%.

14. An apparatus for the preparation of multiple gauge metal strip having transverse variable thicknesses which comprises:
    an adjustable shaving apparatus comprising an adjustable shaving tool provided with a cutting edge defining a pattern corresponding to the multiple gauge surface desired in said strip product, said shaving tool supported by a vertically adjustable tool holder located within an adjustable housing, said housing provided with horizontal and vertical adjustments and fastened to a base communicating with a flat supporting surface, said base provided with a tunnel-like channel for the passage therethrough of metal strip; and a hydrodynamic drawing apparatus located in axial alignment with said shaving apparatus whereby strip exiting said shaving apparatus passes directly through said drawing apparatus, said drawing apparatus comprising a container which houses a quantity of lubricant material and possesses an opening in its side walls for the passage therethrough of metal strip, and a die assembly mounted adjacent said container in communication with one of said openings which defines a multiple gauge cross sectional configuration and which comprises a hydrodynamic section and a reduction section connected thereto, wherein said reduction section is of such configuration that strip reduction is confined to the broad surfaces of said strip and equal percentage reductions of said strip occur uniformly with respect to said variable thicknesses at any point lying within any given transverse plane taken therethrough.

* * * * *